Dec. 3, 1929.  E. R. WILLIAMS  1,738,470
FRUIT PICKER'S BAG
Filed June 13, 1927  2 Sheets-Sheet 2

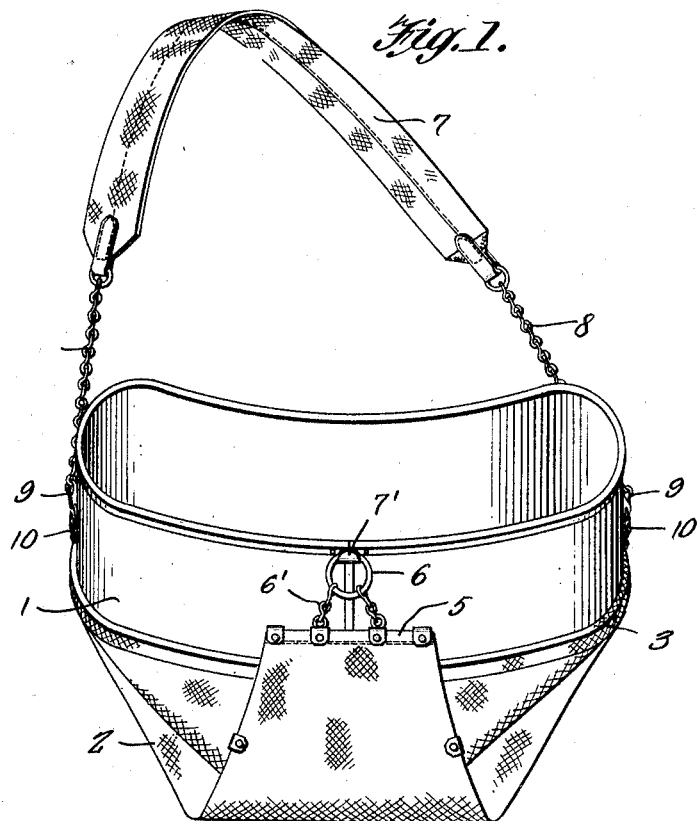

Patented Dec. 3, 1929

1,738,470

UNITED STATES PATENT OFFICE

EDGAR R. WILLIAMS, OF MODESTO, CALIFORNIA

FRUIT-PICKER'S BAG

Application filed June 13, 1927. Serial No. 198,527.

This invention relates to a fruit picking bucket or bag, the general object of the invention being to provide means whereby fruit can be placed in the device and emptied from the same into a box or other receptacle without danger of injuring the fruit and in the minimum amount of time and with but little effort on the part of the picker so that the picker can handle a large quantity of fruit in a short time.

Another object of the invention is to so form the device that it can be used by the picker without discomfort and without interfering with his movements in picking the fruit.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a perspective view of the device.

Figure 2 is an end view thereof.

Figure 3 is a top plan view.

Figure 4:
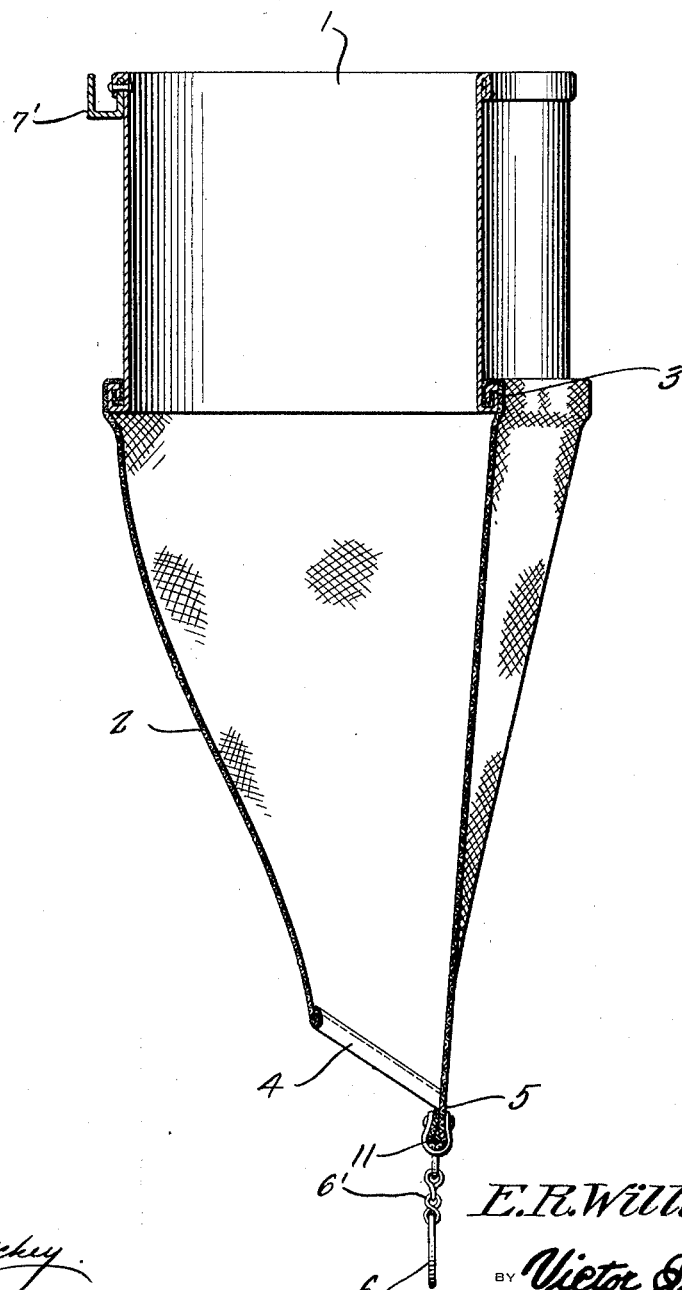
Figure 4 is a sectional view showing the device in dumping position.

In these views 1 indicates an oblong member formed of metal and having its ends curved and its inner side concaved and its outer side convex, the concaved side fitting the body of the picker. As will be seen, this member is of considerable width and forms the body of the device. A bag 2 of canvas or the like is attached to the bottom part of the member 1 by rolling the metal and canvas together, as shown at 3, which securely fastens the canvas to the member 1 and acts to assist the canvas to fold inwardly and prevents it from bulging outwardly. The bag tapers downwardly to a small opening 4 formed in the front of the bag, the rear of the bag being extended to form a flap 5, and a ring 6 is connected by chains 6' to the end of the flap which is reinforced by a rod 11. This ring 6 is adapted to be placed over a hook 7', fastened to the front part of the member 1 at the top thereof, and when the ring is placed in engagement with this hook, the bag is folded adjacent its lower end and the opening closed so that fruit will be held in the device. Then when the device is to be dumped, it is simply necessary to remove the ring from the hook and permit the bag to assume the position shown in Figure 4 so that the fruit will pass through the opening 4 into a box or other receptacle which is to receive the fruit.

A shoulder strap 7 has chains 8 connected to its ends and these chains are adapted to be connected with the ends of the member 1 through means of the snap hooks 9 which are connected with the member 1 by means of the clips 10 fastened to the ends thereof, said clips being arranged at an angle.

When the shoulder strap 7 is placed over the shoulders of the picker, the concaved side of the member 1 will rest against the body of the picker so that he can place fruit in the device with either hand and as will be seen, the member 1 acts to hold the bag open so that the fruit can be easily placed therein. When the device is to be dumped, the ring is removed from the hook and the end of the bag placed over the box or receptacle to receive the fruit so that the fruit will pass from the device into said receptacle and this can be done without removing the device from the body of the picker. With this device, a picker can use both hands to pick fruit and there is no danger of injuring the fruit either in placing the fruit in the device or in dumping the fruit from the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a metal body of considerable depth, a fabric bag having its upper end connected with the lower end of the body, said bag tapering downwardly and having an opening in its lower end, the bottom of the bag around the opening sloping upwardly and forwardly from the rear and the rear of the said bottom part being extended to form a flap, a ring flexibly connected with the lower end of the flap and a hook on the top of the front of the body to receive the ring whereby when the ring is in engagement with the hook, the lower end of the bag will be held in raised position and the opening closed, with the upper part of the bag forming an extended bottom for the body.

In testimony whereof I affix my signature.

EDGAR R. WILLIAMS.